United States Patent [19]
Jacob

[11] Patent Number: 4,573,809
[45] Date of Patent: Mar. 4, 1986

[54] SHAFT MOUNTING

[75] Inventor: Werner Jacob, Frankfurt, Fed. Rep. of Germany

[73] Assignee: INA Walzlager Schaeffler KG, Fed. Rep. of Germany

[21] Appl. No.: 669,629

[22] Filed: Nov. 7, 1984

[30] Foreign Application Priority Data

Nov. 11, 1983 [DE] Fed. Rep. of Germany ....... 3340857

[51] Int. Cl.$^4$ .................. F16C 19/49; F16C 27/00
[52] U.S. Cl. .................. 384/493; 384/494; 384/495; 384/515; 384/517; 384/535; 384/905
[58] Field of Search ............ 384/493, 494, 495, 512, 384/513, 515, 517, 535, 557, 558, 563, 564, 569, 581, 584, 585, 611, 612, 620, 905

[56] References Cited

U.S. PATENT DOCUMENTS 3,460,873 8/1969 Roney .................. 384/535
3,974,079 3/1976 Anderson .............. 384/603

FOREIGN PATENT DOCUMENTS 2068481 8/1981 United Kingdom .

Primary Examiner—Stuart S. Levy
Assistant Examiner—David Werner
Attorney, Agent, or Firm—Bierman, Peroff & Muserlian

[57] ABSTRACT

A mounting of a shaft in the bore of a housing by two antifriction bearings mounted in a sleeve at a distance from each other, the said sleeve being arranged in the bore of a housing having a higher coefficient of thermal expansion than the mounting elements and being provided with a radially outwardly directed flange, the flange being pressed by elastic spring means against a contact surface of the housing traversed by the bore whereby frictional engagement exists between the said surface and the flange characterized in that the sleeve and housing are axially braced with the elastic spring means preferably yielding axially and abutting a housing surface plane parallel to the contact surface and radially supporting the sleeve in relation to the housing, and a method of assembling the said mounting.

8 Claims, 4 Drawing Figures

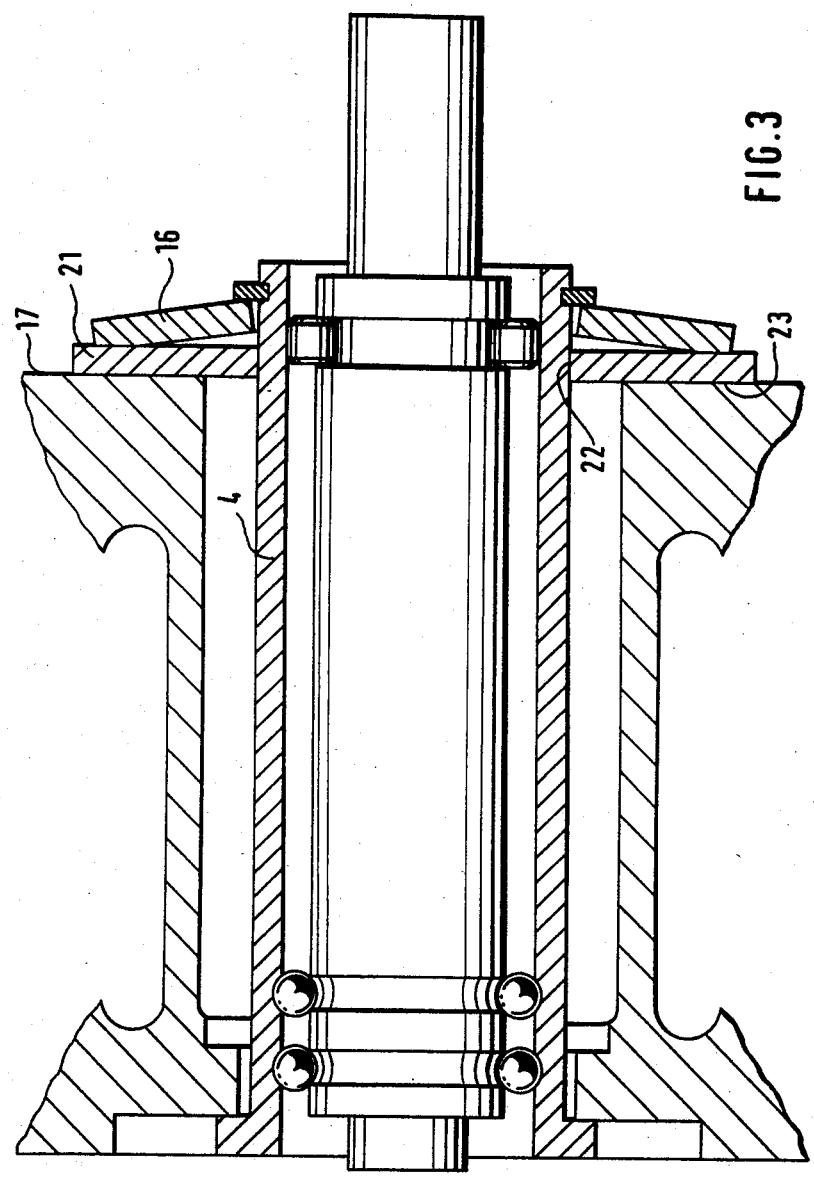

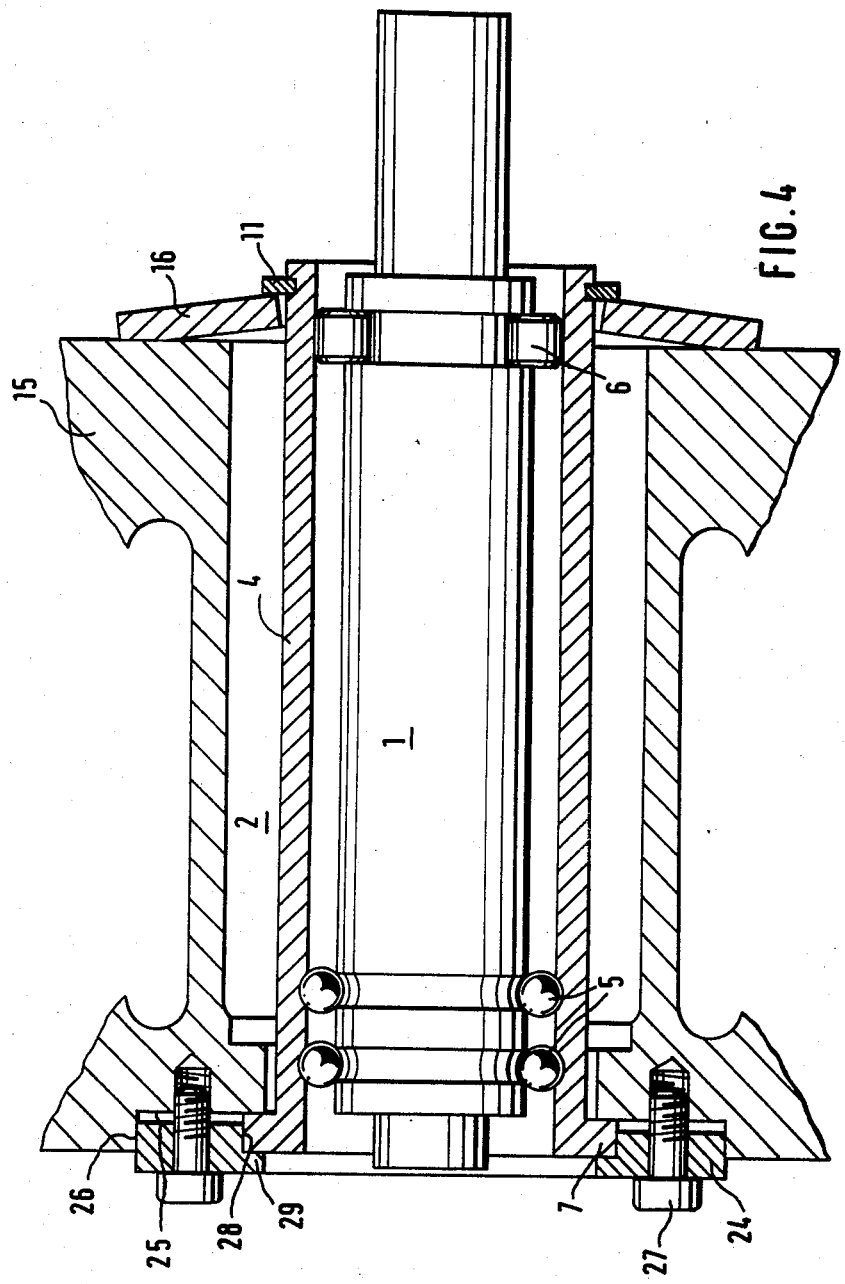

SHAFT MOUNTING

STATE OF THE ART

The mounting of a shaft in the bore of a housing with two antifriction bearings mounted in a sleeve at a distance from each other, the said sleeve being arranged in the bore of a housing with a higher coefficient of thermal expansion than the elements of the mounting and being provided with a radially outward directed flange, which flange is pressed by an elastic-spring means against a contact surface of the housing traversed by the bore whereby frictional engagement exists between said surface and the flange is known from DE-OS No. 30 04 316. The disadvantageous effects of the different coefficients of temperature expansion of light metal and antifriction bearing steel on the operability and durability of the mounting are avoided in a thoroughly satisfactory manner as the sleeve is arranged with an omnidirectional radial clearance in the bore of the housing, and the sleeve, through its flange, is radially and axially secured with respect to the housing by screw bolts that are used as the elastic spring means.

However, the known mounting is restricted in its range of application because it has only slight rigidily, particularly when a large support distance of the antifriction bearings is to be realized, or when substantial loads are to be applied to the shaft-end distant from the flange. In such cases, there is a danger that the sleeve will bend, and as a consequence the spatial relationship of the shaft to the other components, e.g., to the contact surface of the housing, will be changed. In addition, the said mounting is not able to meet the increased demands for its precision in cases of application in which the operating temperature fluctuates over a wide range, e.g. 100° C. and higher.

Since in the said mounting screws are used as the elastic spring means, there occurs a rather uneven normal force distribution at the flange of the sleeve, so that, on the one hand, the normal force in the immediate vicinity of the screws is considerably greater than in the adjoining areas, and, on the other hand, that due to the greatly different settling aspects at the individual screws, different normal forces appear at the latter, which further increases the above-mentioned non-uniformity of the normal force distribution. Where there are great differences between assembly and operating temperature such as must occur automatically at the above-mentioned operating conditions, there results, due to the greater temperature expansion of the housing on the one hand and the non-uniform normal force distribution at the flange of the sleeve on the other, a likewise non-uniform distribution of the frictional force occurs at the flange of the sleeve whereby both the roundness of the sleeve and its centric position in the bore are adversely affected.

OBJECTS OF THE INVENTION

It is an object of the invention to provide a novel mounting of a shaft in the bore of a housing suitable for high loads at the shaft end remote from the flange of a sleeve in the bore and a greater rigidity.

It is another object of the invention of assembling a mounting of a shaft of the invention in the bore of a housing.

These and other objects and advantages of the invention will become obvious from the following detailed description.

THE INVENTION

The mounting of the invention comprises a shaft mounted in the bore of a housing by two antifriction bearings mounted in a sleeve at a distance from each other, the said sleeve being arranged in the bore of a housing having a higher coefficient of thermal expansion than the mounting elements and being provided with a radially outwardly directed flange, the flange being pressed by elastic spring means against a contact surface of the housing traversed by the bore whereby frictional engagement exists between the said surface and the flange characterized in that the sleeve and housing are axially braced with the elastic spring means preferably yielding axially and abutting a housing surface plane parallel to the contact surface and radially supporting the sleeve in relation to the housing.

In the mounting of the invention, the sleeve and housing are axially braced by elastic spring means preferably flexible in the axial direction, with the elastic spring means abutting a housing surface situated plane parallel to the contact surface and bracing the sleeve radially against the housing. This creates a second support of the sleeve in the radial direction so that also greater support distances of the bearings and high loads on the shaft at its end distant from the flange are possible without changing the spatial relation of the shaft to other components. Also, due to the axial bracing of the sleeve and housing at the flange of the sleeve, a uniform normal force distribution occurs whereby the roundness and centric position of the sleeve in the bore of the housing are assured even with great fluctuations of the operating temperature.

In a specific embodiment of the invention which is particularly suitable for applications with high loads on the shaft at its end away from the flange, the sleeve is supported in relation to the housing by the elastic spring means by positive engagement with the elastic spring means shaped, according to a further specific embodiment, as an annular diaphragm, in the bore of which the sleeve is held without play with the diaphragm supported at its outside circumference in relation to the housing surface by a centering means.

According to a variant of the invention, the diaphragm may have a S-shaped cross section. Through the diaphragm-shaped construction of the spring means, but especially because of the S-shaped cross section of the diaphragm, these means despite their preferably axial resilience still have sufficient radial resilience to balance the diameter and/or distance changes to the centering means provided at the housing surface which occur as a result of the temperature expansions and thus maintain the positive engagement.

In another embodiment of the invention, the sleeve is supported in relation to the housing by the elastic spring means by frictional engagement. According to other variations of the invention, the sleeve can either be radially supported in relation to the elastic spring means by frictional engagement, or an axially moveable structural part arranged without radial play on the outside diameter of the sleeve can be provided between the elastic spring means and the housing surface with the frictional engagement existing between this structural part and the housing surface.

A method for the assembly of a mounting of the invention in which the sleeve is supported in relation to the housing by frictional engagement by the elastic spring means provides that the sleeve receiving the shaft mounted in the antifriction bearings is arranged in the bore of the housing with omnidirectional radial play, is radially aligned and held in relation to the housing by a device, whereafter the sleeve and the housing are axially braced by affixing the elastic spring means, and finally the device is removed.

Referring now to the drawings:

FIGS. 2 and 3 are longitudinal cross sections of other embodiments of mountings of the invention, and, FIG. 4 illustrates a method for the assembly of a mounting of the invention.

Figure 1:
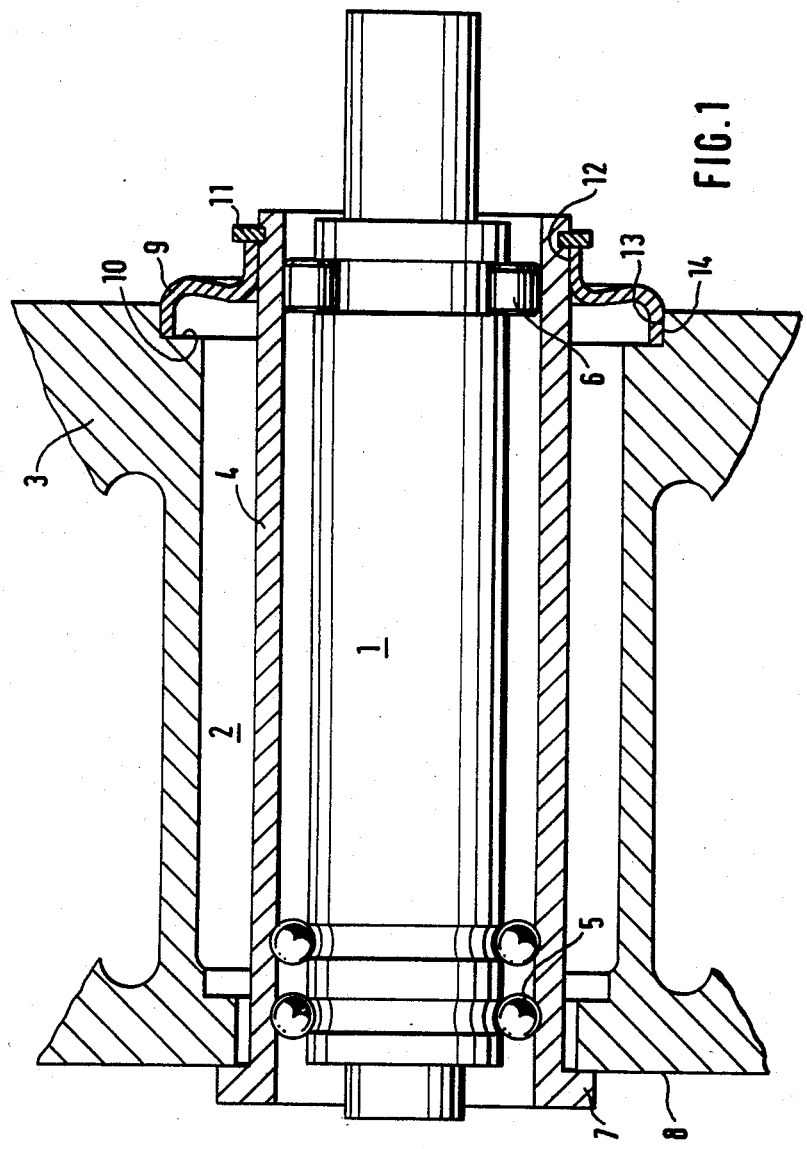
FIG. 1 is a longitudinal cross section of one mounting of the invention.

FIG. 1 shows the mounting of a shaft 1 in the bore 2 of a housing 3 that has a coefficient of thermal expansion higher than the other parts of the mounting by two antifriction bearings affixed in a sleeve 4, one of which is in the form of a fixed bearing 5 and the other in the form of a free bearing 6. The sleeve 4, arranged in the bore 2 with omnidirectional radial play, is provided on the side of the fixed bearing with a radially outward aligned flange 7 which abuts a contact surface 8 of the housing 3. On the side of the free bearing, an elastic spring membrane 9 with an S-shaped cross section, yielding preferably in the axial direction is provided, which is disposed in prestressed condition between the housing surface 10 running plane parallel to the contact surface 8 and a circlip 11 affixed on the outside diameter of the sleeve 4.

By the diaphragm 9, the housing 3 and the sleeve 4 are axially braced and flange 7 is pressed against contact surface 8 of housing 3 so that frictional engagement exists between these parts whereby sleeve 4 is radially supported in relation to the housing on the side of the fixed bearing.

On the side of the free bearing, sleeve 4 is radially supported by positive engagement in relation to the housing 3 since it is received with its outside diameter play-free in the bore 12 of diaphragm 9, and membrane 9, in turn, is surrounded at its outside diameter 13 play-free by a centering shoulder 14 encircling the housing surface 10. Due to the S-shaped form, diaphragm 9 also has a certain radial resilience, and it is ensured that it will then also play-free abut the centering shoulder 14 when the latter increases its diameter as a result of extreme temperature fluctuations.

As a result of the axial bracing of housing 3 and sleeve 4 by diaphragm 9 arranged on the side of the free bearing, it is assured that an extremely uniform normal and thus frictional force distribution will result between flange 7 and contact surface 8, whereby it is ensured, in cases of temperature caused expansion differences between sleeve 4 and housing 3, that the sleeve will retain its circular shape and its centric position in bore 2.

By the support bracing of the sleeve 4 by positive engagement provided at the side of the free bearing by means of diaphragm 9 in addition to the support of the sleeve 4 at its flange 7 by frictional engagement the rigidity of the mounting is increased, and the centric position of sleeve 4 in the bore 2 is ensured during the assembly of the mounting as well as during fluctuations of the operating temperature. All in all, a mounting results which works with utmost precision during extreme fluctuations of the operating temperature and which has a high load capacity.

Figure 2:
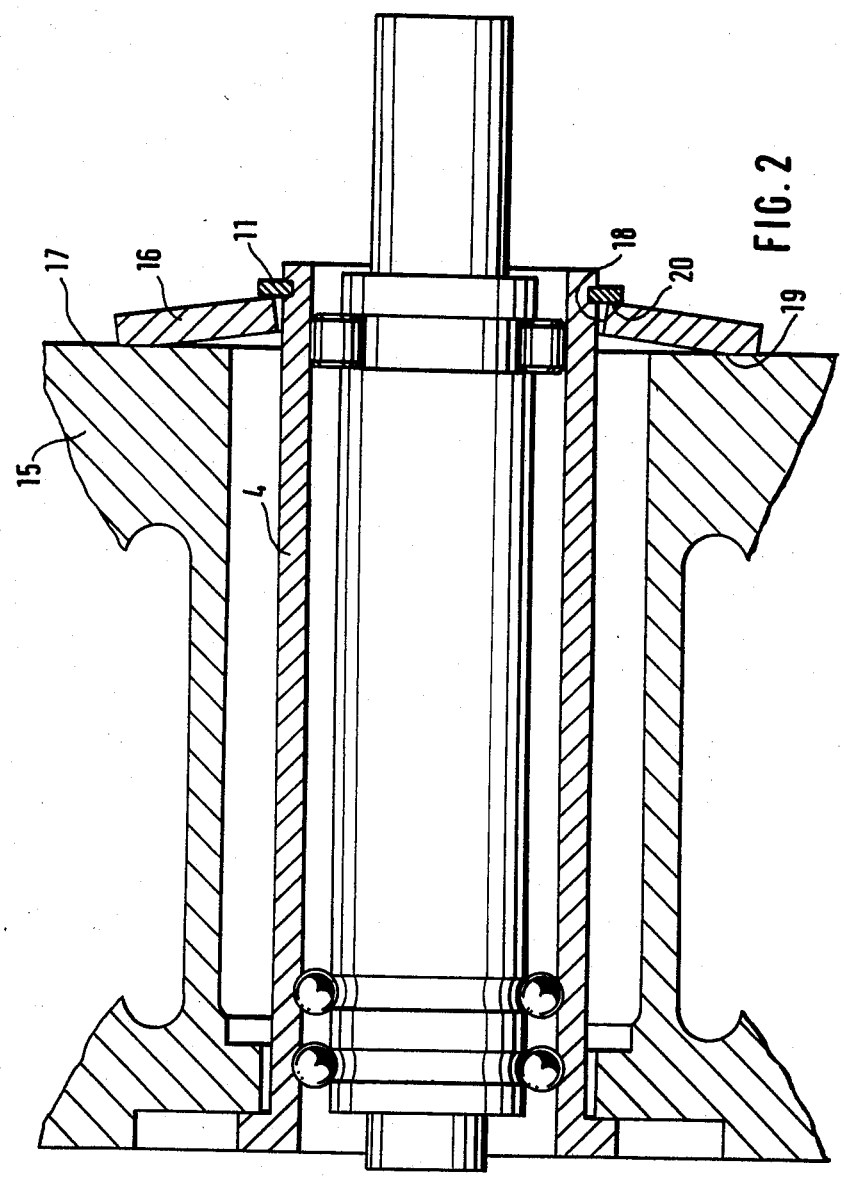

The mounting illustrated in FIG. 2 corresponds to a large extent to the mounting shown in FIG. 1, but sleeve 4 at its free bearing end is radially supported by frictional engagement in relation to the housing 15. As can be seen from FIG. 2, a cup spring 16 is provided for this purpose at the free bearing end of sleeve 4 which is securely arranged between a housing surface 17 and the circlip 11 mounted on the sleeve. Since the cup spring 16 receives sleeve 4 with omnidirectional radial play in its bore 18, the radial support of sleeve 4 against housing 15 is effected by frictional engagement between the circlip 11 arranged on the sleeve and the side of cup spring 16 away from housing surface 17 and by a friction contact between cup spring 16 and housing surface 17. To improve the contact conditions, cup spring 16 is provided with bevels 19 and 20.

In the mounting illustrated in FIG. 3, a friction disc 21 is additionally arranged between cup spring 16 and housing surface 17, which friction disc receives in its bore 22 sleeve 4 without radial play, and is axially braced with sleeve 4 and housing 15 by cup spring 16. In this embodiment of the mounting the radial support of sleeve 4 in relation to the housing 15 is effected on the one hand by positive engagement by means of the friction disc 21 arranged without play on the outside diameter of sleeve 4 and on the other hand by frictional engagement between housing surface 17 and the adjacent front surface 23 of friction disc 21.

Apart from the fact that the support of sleeve 4 by frictional engagement at the free bearing end has a lower load capacity than it would have in case of positive engagement, and that during the assembly of the mounting, additional measures must be taken for centric arrangement of sleeve 4 in the bore, to the characteristics of the mountings illustrated in FIGS. 2 and 3 also applies what has been said with regard to the mounting of FIG. 1.

According to the method illustrated in FIG. 4 for the assembly of a mounting of the invention, sleeve 4 receiving the shaft 1 seated in antifriction bearings 5 and 6 is inserted first into the bore 2 of housing 15 and is then aligned with the axis of bore 2 and held to housing 15 by affixing an annular device 24 which is attached to housing 15 by screws 27 centered with respect to the bore axis by way of its outer diameter by means of a centering shoulder 26 surrounding contact surface 25 and running concentrically with the axis of bore 2. The sleeve 4 is received in bore 28 of device 24 at the outside diameter of its flange 7 and thus centered with respect to the axis of the bore while its flange 7 is pressed against contact surface 25 by means of the radially inwardly directed projection 29 provide on the end of bore 28 of the device 24 away from contact surface 25 when the screws 27 are tightened.

Since sleeve 4 and housing 15 will now occupy the desired position with respect to each other, both these elements are axially braced by affixing cup spring 16 and circlip 11, whereupon the device 24 can be removed. The device can, of course, also be constructed differently than shown in FIG. 4, and the alignment of the sleeve can be effected according to a criterion other than the axis of bore 2.

Various modifications of the mounting and method of the invention may be made without departing from the spirit or scope thereof, and it is to be understood that the invention is intended to be limited only as defined in the appended claims.

What I claim is:

1. An antifriction bearing arrangement for rotatably mounting a shaft in a bore of a housing, the said antifriction bearing arrangement in addition to the shaft comprising a sleeve receiving two antifriction bearings mounted therein at a distance from each other for supporting the shaft, the sleeve being arranged in the bore of the housing which has a higher coefficient of thermal expansion than the parts of the antifriction bearing arrangement and being provided with a radially outwardly directed flange which by elastic spring means is pressed against a contact surface of the housing traversed by the bore and thereby frictionally fixed in the radial direction in relation to the contact surface, characterized in that the sleeve and the housing are axially braced by the said elastic spring means which preferably yield axially, abut a housing surface plane parallel to the contact surface and radially support the sleeve at its end remote from the flange in relation to the housing.

2. An antifriction bearing arrangement of claim 1 wherein the sleeve is supported in relation to the housing by the elastic spring means by positive engagement.

3. An antifriction bearing arrangement of claim 2 wherein the elastic spring means is in the form of an annular diaphragm in whose bore the sleeve is received without play, the diaphragm being supported at its outer circumference in relation to the housing by a centering means.

4. An antifriction bearing arrangement of claim 3 wherein the diaphragm has an S-shaped cross section.

5. An antifriction bearing arrangement of claim 1 wherein the sleeve is supported in relation to the housing by the elastic spring means by frictional engagement.

6. An antifriction bearing arrangement of claim 5 wherein the sleeve is radially supported in relation to the elastic spring means by frictional engagement.

7. An antifriction bearing arrangement of claim 5 wherein an axially moveable structural element arranged without radial play on the outside diameter of the sleeve is provided between the elastic spring means and the housing surface and wherein there is frictional engagement between the structural element and the housing surface.

8. An antifriction bearing arrangement of claim 1 wherein the sleeve is arranged with omnidirectional radial play in the bore of the housing.

* * * * *